(12) United States Patent
Eichelberger et al.

(10) Patent No.: US 9,993,879 B1
(45) Date of Patent: Jun. 12, 2018

(54) EDDY CURRENT VIBRATION ABSORBER ASSEMBLY FOR CUTTING TOOL

(71) Applicant: Kennametal Inc., Latrobe, PA (US)

(72) Inventors: Samuel Eichelberger, Trafford, PA (US); Tony Schmitz, Matthews, NC (US); Shi Chen, North Huntingdon, PA (US); Igor Kaufmann, Nuemberg (DE)

(73) Assignee: KENNAMETAL INC, Latrobe, PA (US)

( * ) Notice: Subject to any disclaimer, the term of this patent is extended or adjusted under 35 U.S.C. 154(b) by 10 days.

(21) Appl. No.: 15/368,725

(22) Filed: Dec. 5, 2016

(51) Int. Cl.
*B23B 29/02* (2006.01)
*F16F 15/03* (2006.01)

(52) U.S. Cl.
CPC .......... *B23B 29/022* (2013.01); *F16F 15/035* (2013.01); *B23B 2250/16* (2013.01); *B23B 2260/004* (2013.01); *B23B 2260/10* (2013.01); *F16F 2222/06* (2013.01)

(58) Field of Classification Search
CPC .. B23B 29/022; B23B 2250/16; F16F 15/035; F16F 2222/06
See application file for complete search history.

(56) References Cited

U.S. PATENT DOCUMENTS

| | | |
|---|---|---|
| 2,699,696 A | 1/1955 | Hahn |
| 3,164,041 A | 1/1965 | Carlstedt |
| 3,230,833 A | 1/1966 | Shurtliff |
| 3,242,791 A | 3/1966 | Smith |
| 3,393,334 A * | 7/1968 | Sundstrom ............ B23B 29/022 310/93 |
| 3,447,402 A | 6/1969 | Ray |
| 3,774,730 A | 11/1973 | Maddux |
| 3,837,758 A * | 9/1974 | Streicher ............ B23Q 17/0976 408/143 |
| 3,838,936 A | 10/1974 | Andreassen et al. |
| 4,061,438 A | 12/1977 | New |
| 4,553,884 A | 11/1985 | Fitzgerald et al. |
| 4,998,851 A | 3/1991 | Hunt |
| 5,810,528 A | 9/1998 | O'Connor et al. |

(Continued)

FOREIGN PATENT DOCUMENTS

| | | | |
|---|---|---|---|
| CN | 101508029 A | * | 8/2009 |
| CN | 104607706 A | * | 5/2015 |

(Continued)

OTHER PUBLICATIONS

Proquest translation of CN 101508029A, printed Jan. 2018.*

*Primary Examiner* — Daniel Howell
(74) *Attorney, Agent, or Firm* — Ian K. Samways (57) ABSTRACT

A cutting tool includes a cutting insert mounted to a head attached to a collar at a first end of the cutting tool. A shank is located at a second, opposite end of the cutting tool. A central cavity extends inwardly from the first end toward the shank. An eddy current vibration absorber assembly is disposed within the central cavity. The eddy current vibration absorber assembly includes an absorber mass made of an electrically conductive material, a magnetic material proximate the absorber mass, and a support member for supporting the absorber mass within the central cavity. The eddy current vibration absorber assembly is tuned by selectively adjusting a distance between the absorber mass and the magnetic material.

16 Claims, 5 Drawing Sheets

(56) References Cited

U.S. PATENT DOCUMENTS

| | | |
|---|---|---|
| 6,443,673 B1 | 9/2002 | Etling et al. |
| 6,705,184 B2 | 3/2004 | Cardemon et al. |
| 6,744,155 B1 * | 6/2004 | Stoiber .................. H02K 41/02 |
| | | 310/15 |
| 7,121,768 B2 | 10/2006 | Hole et al. |
| 7,490,536 B2 | 2/2009 | Kashima et al. |
| 8,430,610 B2 | 4/2013 | Komai |

FOREIGN PATENT DOCUMENTS

| | | | | |
|---|---|---|---|---|
| FR | 1016808 A | 11/1952 | | |
| GB | 1032232 | 6/1966 | | |
| JP | 2-185303 A | 7/1990 | | |
| JP | 03-86404 A | 4/1991 | | |
| JP | 2002079405 A * | 3/2002 | ........... | B23B 29/022 |
| SU | 1134300 A | 1/1985 | | |
| SU | 1196153 A | 12/1985 | | |
| WO | 2004/024389 A1 | 8/2003 | | |
| WO | 2014/033020 A1 | 8/2013 | | |

* cited by examiner

EDDY CURRENT VIBRATION ABSORBER ASSEMBLY FOR CUTTING TOOL

FIELD OF THE INVENTION

In general, the invention relates to a cutting tool and, more particularly, to a cutting tool, such as a boring bar, with a tunable dynamic vibration absorber assembly that utilizes eddy currents for vibration suppression.

BACKGROUND OF THE INVENTION

During a metal cutting operation, any vibratory motion between a cutting tool and workpiece may lead to undesirable cutting performances such as poor workpiece surface finish and out-of-tolerance finished workpieces. Furthermore, such vibration may cause the cutting tool or the machine tool to become damaged.

To reduce these vibrations, the metal removal rate can be decreased. However, this approach interferes with production and only minimally reduces the amount of vibration.

Instead of decreasing metal removal rates, tuned boring bars have been manufactured using a heavy mass supported by rubber elements. The rubber elements are responsible for providing the stiffness and damping for the dynamic absorber system. Stiffness and damping are material specific properties. Therefore, it is impossible to design the dynamic absorber package to specified stiffness and damping parameters for optimum performance using rubber elements alone. Another method to introduce damping that has been employed is the addition of a viscous fluid in the dynamic absorber cavity within the boring bar shank. While this method does increase damping, the rubber elements and viscous fluid must be chosen carefully to ensure compatibility. Otherwise, the viscous fluid can deteriorate the rubber elements and alter the performance of the boring bar. Therefore, there is a need to provide a dynamic absorber that solves the above-mentioned problems.

SUMMARY OF THE INVENTION

The problem of using rubber elements to suppress vibration in a cutting tool is solved by providing an eddy current dynamic absorber. The eddy current effect arises from the interaction of a magnet that produces a strong magnetic field and a mass made of a highly electrically conductive material. The relative motion between the magnet and the conductive material causes the conductive material to experience a change in the magnetic flux (i.e. varying magnetic field strength) that is described by Faraday's law of induction, thereby creating a flow of electrons within the conductive material. As the current flows, it creates small loops, which are referred to as eddy currents. The direction of the eddy current obeys Lenz's law, which states that an induced current always flows in the direction opposite to the source that produced the induced current. Due to the direction of rotation of the eddy currents, a magnetic field is produced that is opposite in direction to the relative motion that created them. This opposite magnetic force resists the relative motion and provides damping of vibrations during a cutting operation. The amount of damping that can be produced is determined by the conductivity of the conductive material, the magnetic strength of the magnet, the thickness of the conductive material, the surface area of the magnet, and the distance between the conductive material and the magnet. These factors can be used to mathematically predict the amount of damping obtainable which will make it possible to build a dynamic absorber to the specified damping parameters needed to optimize the performance of the tuned eddy current vibration absorber assembly.

In one aspect of the invention, a cutting tool comprises a cutting insert mounted to a head attached to a collar at a first end of the cutting tool. A shank is located at a second, opposite end of the cutting tool. A central cavity extends inwardly from the first end toward the shank. An eddy current vibration absorber assembly is disposed within the central cavity. The eddy current vibration absorber assembly comprises a magnetic material proximate an absorber mass made of electrically conductive material, and a support member for supporting the absorber mass within the cavity, wherein the eddy current vibration absorber assembly is tuned by selectively adjusting a distance between the absorber mass and the magnetic material.

In another aspect of the invention, an eddy current vibration absorber assembly comprises an absorber mass made of an electrically conductive material; a magnetic material proximate the absorber; and a support member for supporting the absorber mass within a cavity, wherein the eddy current vibration absorber assembly is tuned by selectively adjusting a distance between the absorber mass and the magnetic material.

In yet another aspect of the invention, a method of tuning an eddy current vibration absorber assembly, the assembly comprising an absorber mass made of an electrically conductive material; a magnetic material proximate the absorber; and a support member for supporting the absorber mass within a cavity, the method comprising selectively adjusting a distance between the absorber mass and the magnetic material.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
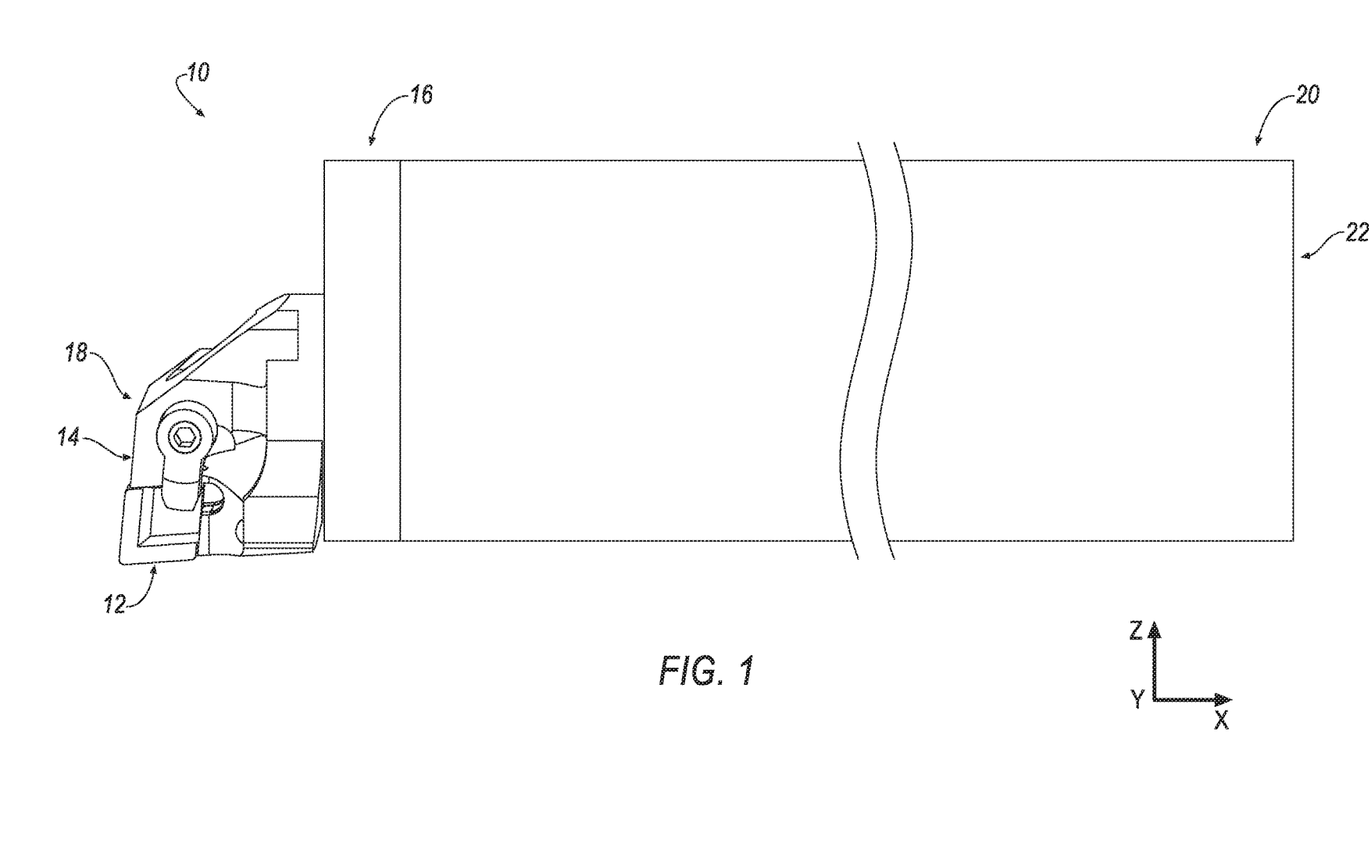
FIG. 1 is a top view of a cutting tool with an eddy current vibration absorber assembly according to an embodiment of the invention.
Figure 2:
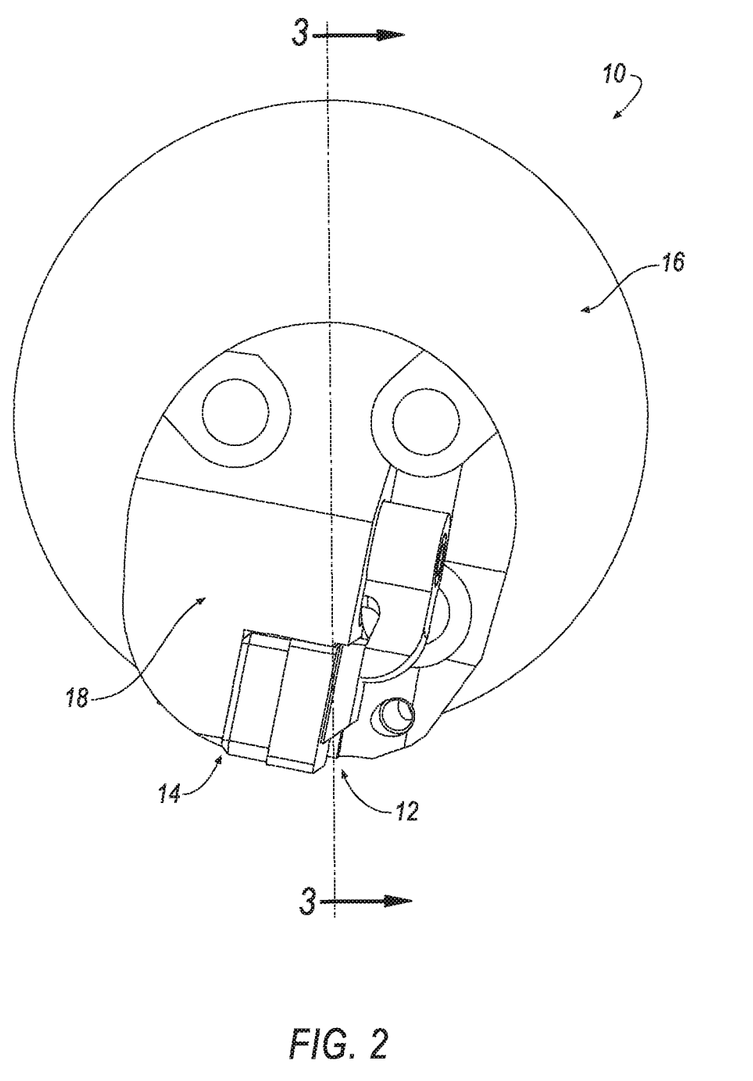
FIG. 2 is an end view of the cutting tool of FIG. 1.
Figure 3:
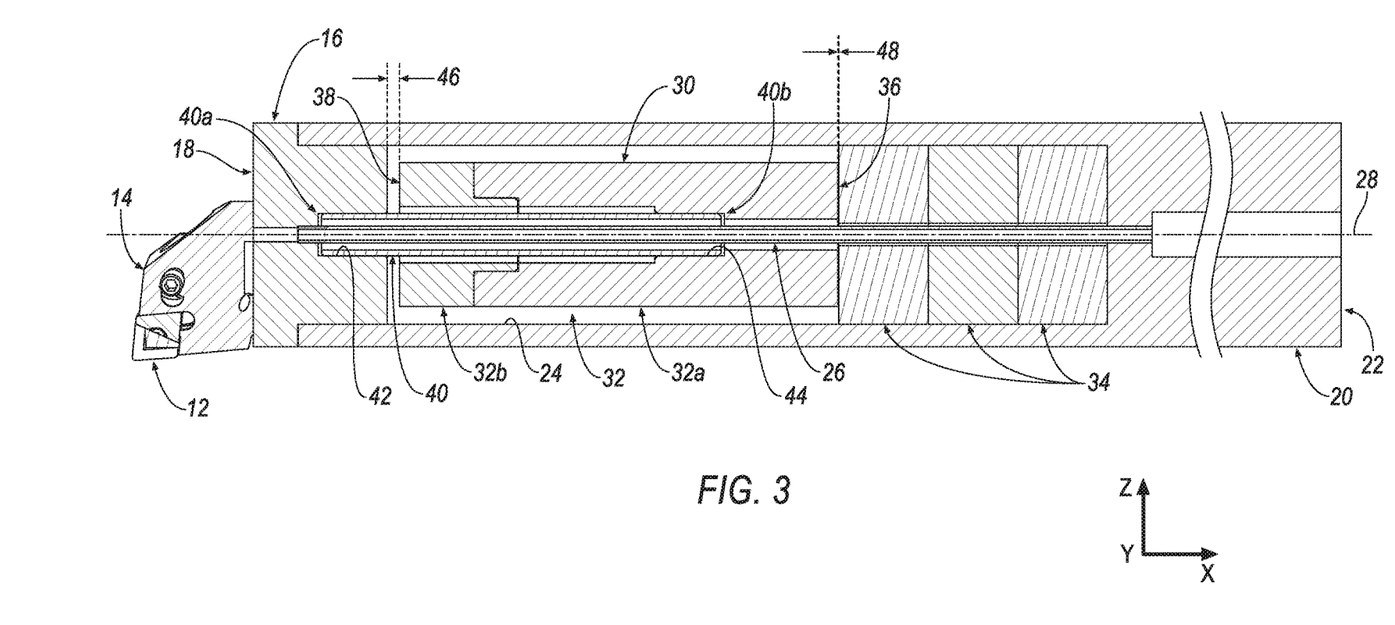
FIG. 3 is a cross-sectional view of the cutting tool with the eddy current vibration absorber assembly taken along line 3-3 of FIG. 2.

Referring now to FIGS. 1-3, a cutting tool 10, such as a boring bar, is shown according to an embodiment of the invention. Although the present invention is directed to a boring bar 10 for boring deep holes in work pieces, the principles of the invention can be applied to any cutting tool that produces vibrations when cutting a work piece.

A cutting tool, such as a cutting tool 12, such as a cutting insert, may be mounted in a conventional manner to a head 14 attached to a collar 16 at one end 18 of the boring bar 10. A shank 20 is located at the opposite end 22 of the boring bar 10. The boring bar 10 has a central cavity 24 extending inwardly from the end 18 toward the shank 20. In the illustrated embodiment, the boring bar 10 includes a coolant tube 26 extending along a central, longitudinal axis 28 of the boring bar 10 for providing coolant proximate the cutting insert 12. It will be appreciated that the coolant tube 26 is optional and can be omitted. For example, the coolant tube can be replaced with a threaded stud or a solid stud with threaded ends. In another example, the shank 20 can be manufactured without the central cavity 20 as a solid shank.

Use of the boring bar 10 in a metalworking operation will produce vibrations that travel through the boring bar 10, thereby affecting the stability of the cutting process. For this reason, the boring bar 10 is provided with an eddy current vibration absorber assembly, shown generally at 30, according to an embodiment of the invention that will dampen the vibrations traveling through the boring bar 10.

In general, Faraday's law of induction is a basic law of electromagnetism predicting how a magnetic field will interact with an electric circuit to produce an electromotive force (EMF), which is a phenomenon called electromagnetic induction. It is a fundamental operating principle of transformers, inductors, and many types of electrical motors, generators and solenoids.

Faraday's law states that the EMF is also given by the rate of change of the magnetic flux:

$$\varepsilon = \frac{\partial \Phi}{\partial t} \qquad \text{(Eq. 1)}$$

where $\varepsilon$ is the electromotive force (EMF) and $\Phi$ is the magnetic flux. The direction of the electromotive force is given by Lenz's law, which states that the direction of current induced in a conductor by a changing magnetic field due to Faraday's law of induction will be such that it will create a field that opposes the change that produced it. Lenz's law is shown by the negative sign in Faraday's law of induction:

$$\varepsilon = -\frac{\partial \Phi}{\partial t} \qquad \text{(Eq. 2)}$$

which indicates that the induced voltage ($\varepsilon$) and the change in magnetic flux ($\delta\Phi$) have opposite signs. It is a qualitative law that specifies the direction of induced current, but says nothing about its magnitude. Lenz's law explains the direction of many effects in electromagnetism, such as the direction of voltage induced in an inductor or wire loop by a changing current, or why eddy currents exert a drag force on moving objects in a magnetic field.

Eddy currents (also called Foucault currents) are loops of electrical current induced within conductors by a changing magnetic field in the conductor, due to Faraday's law of induction. Eddy currents flow in closed loops within conductors, in planes perpendicular to the magnetic field. They can be induced within nearby stationary conductors by a time-varying magnetic field created by an AC electromagnet or transformer, or by relative motion between a magnet and a nearby conductor. The magnitude of the current in a given loop is proportional to the strength of the magnetic field, the area of the loop, and the rate of change of flux, and inversely proportional to the resistivity of the material.

According to Lenz's law, an eddy current creates a magnetic field that opposes the magnetic field that created it, and thus eddy currents react back on the source of the magnetic field. For example, a nearby conductive surface will exert a drag force on a moving magnet that opposes its motion, due to eddy currents induced in the surface by the moving magnetic field. This effect is employed in eddy current brakes, which are used to stop rotating power tools quickly when they are turned off. The current flowing through the resistance of the conductor also dissipates energy as heat in the material.

Referring now to FIG. 3, the eddy current vibration absorber assembly 30 comprises a generally cylindrical absorber mass 32 adjacent a magnetic material 34. In the illustrated embodiment, the magnetic material 34 comprises one or more permanent magnets 34 disposed within the cavity 24 proximate the shank 20 of the cutting tool 10. However, it will be appreciated that the invention is not limited by the type of magnetic material, and that the invention can be practiced with any desirable magnetic element that produces a magnetic field, such as an electromagnetic field, and the like.

At least a portion of the absorber mass 32 is made of highly electrically conductive material, such as copper, aluminum, and the like. In the illustrated embodiment, the absorber mass 32 has two portions: a first portion 32a made of a highly electrically conductive material, such as copper, aluminum, and the like; and a second portion 32b made of a different material with a relatively higher density, such as tungsten, and the like. The second portion 32b is provided in the illustrated embodiment so that the absorber mass 32 has an adequate amount of total mass to adequately dampen vibrations in the cutting tool 10. However, it will be appreciated that the absorber mass 32 can be made of a single piece of electrically conductive material, so long as the mass of the absorber mass 32 is sufficient to provide adequate dampening of vibrations in the cutting tool 10. The first portion 32a can be secured to the second portion 32b by press fitting, brazing, welding, and the like. In the illustrated embodiment, for example, the first portion 32a is press fit to the second portion 32b.

As seen in FIG. 3, the absorber mass 32 has a first end 36 proximate the magnetic material 34, and a second, opposite end 38 proximate the collar 16. In the illustrated embodiment, the absorber mass 32 has a total length of about 5.0 inches (127 mm), wherein the exterior surface of the first portion 32a has a length of about 4.0 inches (101.6 mm) and the exterior surface of the second portion 32b has a length of about 1.0 inches (25.4 mm). Thus, there is about a 4:1 ratio in the relative length between the first portion 32a and the second portion 32b.

The absorber mass 32 is supported within the cavity 24 by a support member 40. In the illustrated embodiment, the support member 40 is made of a suitable material to provide some stiffness or rigidity, but allow the absorber mass 32 to move within the cavity 24. For example, the support member 40 can be made of a relatively strong, lightweight material, such as titanium, and the like. In the illustrated embodiment that includes the coolant tube 26, the support member 40 is annular in shape to allow the coolant tube 26 to pass through the support member 40. In another embodiment in which the coolant tube 26 is omitted, the support member 40 can be a solid member. One end 40a of the support member 40 is secured within a cavity 42 of the collar 16 and the opposite end 40b of the support member 40 is secured within a cavity 44 of the absorber mass 32. The support member 40 can be secured to the collar 16 and the absorber mass 32 by press fitting, brazing, welding, and the like. In the illustrated embodiment, the support member 40 is press fit into the collar 16 and the absorber mass 32.

As noted above, the absorber mass 32 is suspended within the cavity 24 only by the support member 40 and the absorber mass 32 is allowed to move within the cavity 24. It is noted that the coolant tube 26 (if included) does not provide any additional support for the absorber mass 32. In addition, the absorber mass 32 has an outer diameter that is smaller than the inner diameter of the cavity 24 that enables the absorber mass 32 to freely move in two directions perpendicular to the longitudinal axis 28 of the cutting tool 10 (i.e. in the y- and z-directions). Further, the second end 38 of the absorber mass 32 is separated from the collar 16 by a small distance 46 to allow clearance between the collar 16 and the absorber mass 32. Thus, the support member 40 acts as a cantilever beam and the absorber mass 32 acts as a point mass on a tip of the support member 40 (i.e. cantilever beam). It should be noted that the absorber mass 32 is fixed in the x-direction, and that the absorber assembly 30 can be tuned by adjusting the distance 48 between the absorber mass 32 and the magnetic material 34.

Figure 4:
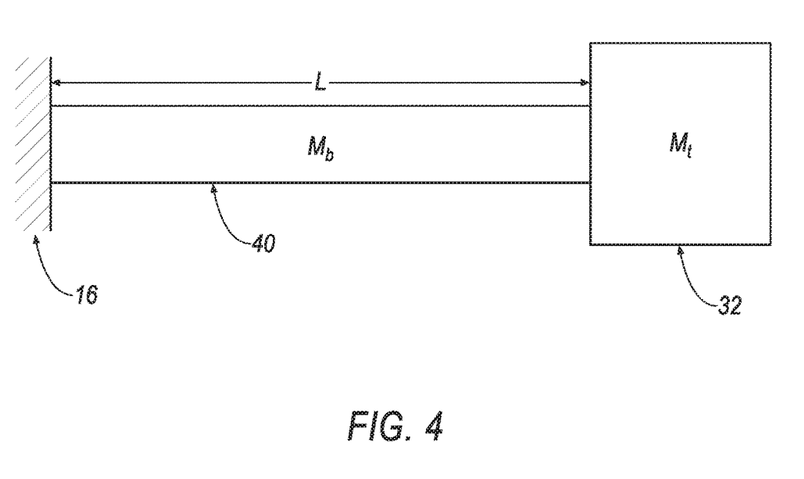
FIG. 4 is an end view of an eddy current vibration absorber assembly according to an embodiment of the invention.

Referring now to FIG. 4, a schematic representation of the cantilever of the eddy current vibration absorber assembly 30 is described. The eddy current vibration absorber assembly 30 has a natural frequency, Wn, that can be defined by the following equation:

$$Wn = \sqrt{\frac{K}{M}} \quad \text{(Eq. 3)}$$

where,
Wn=natural frequency (rad/s),
K=stiffness (N/m), and
M=mass (kg).

The stiffness, K, is given by the following equation:

$$K = \frac{3EI}{L^3} \quad \text{(Eq. 4)}$$

where,
E=modulus of elasticity (N/m²),
I=second moment of inertia (m⁴), and
L=length (m).

The mass, M, is given by the following equation:

$$M=(33/140)M_b+M \quad \text{(Eq. 5)}$$

where,
$M_b$=mass of beam (kg),
$M_t$=mass at tip (kg),

The amount of the highly electrically conductive material 32a of the absorber mass 32 is determined by how much damping is required. If the amount of damping is met by the amount of material 32a and the mass requirement is not met, then the material 32b having the relatively higher density is added until the mass requirement is met. The length, L, outer diameter (OD) and inner diameter (ID) of the support member 40 is selected to meet a specific stiffness requirement.

Referring back to FIG. 3, the electrically conductive material 32a of the absorber mass 32 is separated from the magnetic material 34 by a very small distance 48 when the eddy current vibration absorber assembly 30 is mounted within the central cavity 24 of the cutting tool 10. The distance 48 can be in a range between about 0.001 inches (0.025 mm) to about 0.100 inches (2.54 mm). In the illustrated embodiment, the distance 48 is about 0.01 inches (0.25 mm). The small distance 48 allows the eddy current vibration absorber 30 to be tuned by selectively adjusting the distance 48 between the absorber mass 32 and the magnetic material 34.

Figure 5:
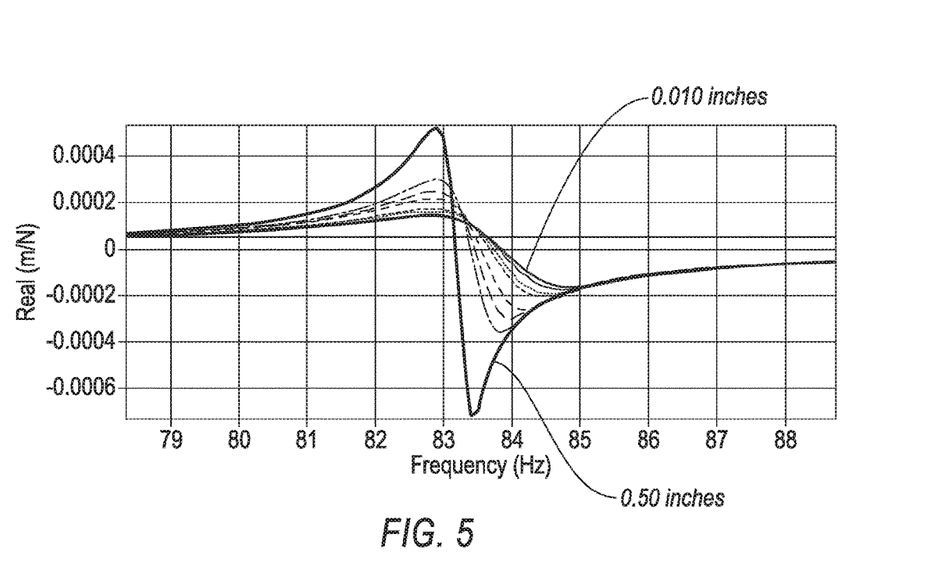
FIG. 5 is a graph of real data as a function of the distance between the absorber mass and the magnetic material.
Figure 6:
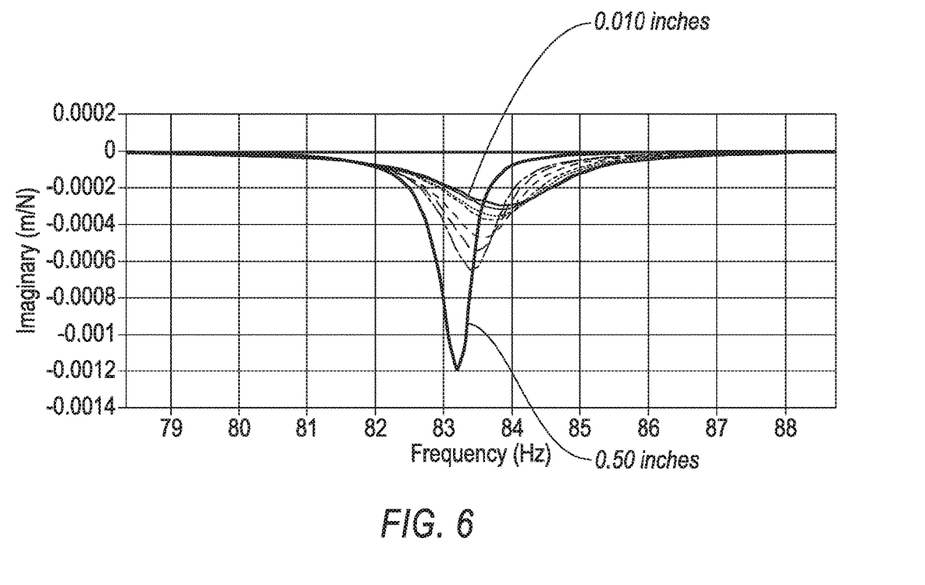
FIG. 6 is a graph of imaginary data as a function of the distance between the absorber mass and the magnetic material.

FIGS. 5 and 6 shows test results for the eddy current vibration absorber assembly 30 of the invention. Specifically, FIG. 5 shows a graph of real data (m/N) as a function of the distance 48 between the absorber mass 32 and the magnetic material 34, and FIG. 6 shows a graph of imaginary data (m/N) as a function of the distance 48 between the absorber mass 32 and the magnetic material 34. In FIGS. 5 and 6, the distance 48 was selectively adjusted between about 0.50 inches (12.7 mm) and 0.010 inches (0.25 mm). As seen in FIGS. 5 and 6, the distance 48 of about 0.50 inches (12.7 mm) provided the least desirable damping, while the distance 48 of about 0.010 inches (0.25 mm) provided the most desirable damping.

As described above, the cutting tool 10, such as a boring bar, includes an eddy current vibration absorber assembly 30 that utilizes eddy currents to dampen vibrations of the cutting tool 10. The method of using eddy currents for suppression of vibrations generated by the cutting tool provides for superior damping capability, as compared to conventional damping methods using an absorber mass with rubber elements.

The patents and publications referred to herein are hereby incorporated by reference.

Having described presently preferred embodiments the invention may be otherwise embodied within the scope of the appended claims.

What is claimed is:

1. A cutting tool, comprising:
   a cutting insert mounted to a head attached to a collar at a first end of the cutting tool;
   a shank located at a second, opposite end of the cutting tool;
   a central cavity extending inwardly from the first end toward the shank; and
   an eddy current vibration absorber assembly disposed within the central cavity, the eddy current vibration absorber assembly comprising an absorber mass made of an electrically conductive material proximate a magnetic material, and a support member for supporting the absorber mass within the cavity,
   wherein the eddy current vibration absorber assembly is tuned by selectively adjusting a distance between the absorber mass and the magnetic material.

2. The cutting tool of claim 1, wherein the absorber mass is made of copper.

3. The cutting tool of claim 1, wherein the absorber mass is made of two different materials.

4. The cutting tool of claim 1, wherein the magnetic material comprises a plurality of permanent magnets.

5. The cutting tool of claim 1, wherein the magnetic material comprises an electromagnet.

6. The cutting tool of claim 1, wherein the support member is made of titanium.

7. The cutting tool of claim 1, wherein one end of the support member is secured within a cavity of the collar and an opposite end of the support member is secured within a cavity of the absorber mass.

8. The cutting tool of claim 1, wherein the cutting tool comprises a boring bar.

9. An eddy current vibration absorber assembly, comprising:
- an absorber mass made of an electrically conductive material;
- a magnetic material proximate the absorber mass; and
- a support member for supporting the absorber mass within a central cavity of a cutting tool,
- wherein the eddy current vibration absorber assembly is tuned by selectively adjusting a distance between the absorber mass and the magnetic material.

10. The eddy current vibration absorber assembly of claim 9, wherein the absorber mass is made of copper.

11. The eddy current vibration absorber assembly of claim 9, wherein the absorber mass is made of two different materials.

12. The eddy current vibration absorber assembly of claim 9, wherein the magnetic material comprises a plurality of permanent magnets.

13. The eddy current vibration absorber assembly of claim 9, wherein the magnetic material comprises an electromagnet.

14. The eddy current vibration absorber assembly of claim 9, wherein the support member is made of titanium.

15. The eddy current vibration absorber assembly of claim 9, wherein one end of the support member is secured within a cavity of the collar and an opposite end of the support member is secured within a cavity of the absorber mass.

16. A method of tuning an eddy current vibration absorber assembly disposed within a central cavity of a cutting tool, the eddy current vibration absorber assembly comprising an absorber mass made of an electrically conductive material; a magnetic material proximate the absorber mass; and a support member for supporting the absorber mass within the central cavity, the method comprising selectively adjusting a distance between the absorber mass and the magnetic material.

* * * * *